United States Patent
Warner

[19]

[11] Patent Number: 6,081,189
[45] Date of Patent: Jun. 27, 2000

[54] APPARATUS FOR TESTING THE LIGHT CIRCUIT OF A TRAILER

[76] Inventor: Vernon Phelps Warner, 4201 Ellis Rd., Fort Myers, Fla. 33905

[21] Appl. No.: 09/181,049

[22] Filed: Oct. 27, 1998

Related U.S. Application Data

[60] Provisional application No. 60/078,206, Mar. 16, 1998.
[51] Int. Cl.[7] .................................................. B60Q 11/00
[52] U.S. Cl. ......................... 340/458; 340/431; 340/642; 324/504
[58] Field of Search ................................. 340/458, 642, 340/641, 431; 324/503, 504

[56] References Cited

U.S. PATENT DOCUMENTS

| | | | |
|---|---|---|---|
| 4,866,390 | 9/1989 | Butchko | 324/504 |
| 5,602,482 | 2/1997 | Gutierrez | 324/504 |
| 5,629,680 | 5/1997 | Makhija | 340/664 |
| 5,635,843 | 6/1997 | Borland | 324/504 |

*Primary Examiner*—Daryl Pope
*Attorney, Agent, or Firm*—William E. Noonan

[57] ABSTRACT

An apparatus is provided for electrically testing the standard light circuit of a trailer. The apparatus includes a battery and a flasher component electrically connected to a positive terminal of the battery. A switch is electrically connected to the flasher component. There is an indicator light associated with a respective trailer light. A positive conductor is interconnected between the switch and the indicator light. A ground conductor is interconnected between a negative terminal of the battery and the indicator light. A harness is releasably attached to the standard connector component of the trailer's light circuit. The harness electrically connects the positive conductor to the positive wire of the light circuit and likewise electrically connects the negative terminal of the battery to the ground wire of the trailer's light circuit. The switch is selectively opened to de-energize the positive conductor and closed to energize the positive conductor. Attaching the harness to the lighting circuit connector component and closing the switch causes the indicator light to flash intermittently when the trailer light, positive wire and ground wire are operative and glow continuously when at least one of the trailer light, positive wire and ground wire is inoperative.

16 Claims, 2 Drawing Sheets

APPARATUS FOR TESTING THE LIGHT CIRCUIT OF A TRAILER

RELATED APPLICATIONS

This application is a continuation in part of U.S. Provisional Patent Application Ser. No. 60/078,206, filed Mar. 16, 1998.

FIELD OF THE INVENTION

This invention relates to an apparatus for testing the light circuit of a trailer and, more particularly to an apparatus for quickly and conveniently checking the trailer's turning and driving lights and associated wiring.

BACKGROUND OF THE INVENTION

Trailers are commonly utilized for a wide variety of towing and hauling purposes. Virtually all trailers are equipped with a standard set of rear lights, including turning, running (driving) and brake lights. Inspecting these lights is usually quite time consuming and annoying. In order for the rear lights and their associated wiring to be inspected, the trailer lighting circuit must be connected to a standard 12-volt battery. This is not a problem if the trailer is already hitched to the tow vehicle. However, in many cases, the inspection is performed without a connected tow vehicle, such as when the trailer is in a storage lot. In such circumstances, the battery first must be carried to the trailer. This is often quite cumbersome and inconvenient, particularly when a standard 12-volt automobile battery is used. Next, the inspector must connect the battery in turn to each light circuit of the trailer. After the proper connection is made, that person, or an assistant must walk to the rear of the trailer and determine whether the corresponding lights are operating properly. If the particular light or lights in question are not working, the inspector is still not able to determine the precise source of the problem. Light failure may be caused by a defective bulb, deteriorated wiring, a bad connection or a bad ground. The precise source of the difficulty must be investigated more fully. All of this testing and rewiring is very aggravating and time consuming. Oftentimes, it can require over 30 minutes to properly check the lighting for just a single trailer. If a number of trailers must be checked, the time, expense and manpower involved may be prohibitive.

Even when the trailer being inspected is already connected to an automobile, performing a check of the trailer's lighting circuit is often problematic. In such cases, the trailer lighting circuit is connected to the tow vehicle through a standard connecting plug. As a result, the person checking the lights does not have to connect the battery successively to each wire of the lighting circuit. However, checking the trailer lights can still constitute quite an annoyance. As each light is tested, the person conducting the inspection must either walk to the rear of the trailer or use an assistant. If a bad light is revealed, the automobile itself may be the source of the difficulty. Considerable time and effort are usually required to identify the precise source of the problem.

SUMMARY OF INVENTION

It is therefore an object of the present invention to provide an apparatus for quickly, conveniently and reliably testing the lighting circuit of a trailer.

It is a further object of this invention to provide a test apparatus that quickly and accurately determines the cause of an inoperative trailer light.

It is a further object of this invention to provide a trailer light circuit tester that permits testing to be performed without having to connect each light of the trailer successively to a battery.

It is a further object of this invention to provide a trailer light circuit tester that eliminates the time, exertion and manpower that are normally associated with testing trailer lights.

It is a further object of this invention to provide a trailer light circuit tester that permits testing to be performed quickly and conveniently in crowded storage lots and other locations where it is normally difficult to manipulate large batteries or to connect an automobile to the trailer for testing.

It is a further object of this invention to provide a trailer light circuit tester that avoids the time delays and uncertainty involved when the trailer being checked is already connected to the tow vehicle.

It is a further object of this invention to provide a trailer light circuit tester that is very compact and lightweight and which may be quickly and conveniently connected to a trailer's light circuit in order to test that circuit for defects.

This invention features an apparatus for electrically testing the standard light circuit of a trailer. Such circuits include a light, positive and ground wires electrically connected to the light and a connector component carried by the wires and selectively engaged with a source of electric power to energize the circuit. The test apparatus includes a battery and a flasher component electrically connected to a positive terminal of the battery. The switch is electrically connected to the flasher component. An indicator light is associated with the trailer light. A positive conductor is interconnected between the switch and the indicator light. A ground conductor is interconnected between the indicator light and a negative terminal of the battery. Harness means are releasably attached to the connector component of the light circuit for electrically connecting the positive conductor to the positive wire of the light circuit and electrically connecting the negative terminal of the battery to the ground wire of the light circuit. The switch is selectively opened to de-energize the positive conductor and closed to energize the positive conductor. Attaching the harness means to the light circuit connector component and closing the switch causes the indicator light to flash intermittently when the trailer light, positive wire and ground wire are operative. In contrast, attaching the harness means to the connector component and closing the switch causes the indicator light to glow continuously when at least one of the trailer light, positive wire and ground wire is inoperative.

In a preferred embodiment, the apparatus includes three or more indicator lights. Respective lights or sets of lights are provided for the right hand directional turn signal, the left hand directional turn signal, and as running or drive lights. In certain embodiments, a separate indicator light may correspond to the brake lights. In each instance, the indicator light is connected to a switch through a respective positive conductor and each indicator light is connected through a ground conductor to the negative terminal of the battery.

The switch may include a toggle switch. More particularly, the switch may comprise a single pole, double-throw switch (which typically serves as a switch for two distinct indicator lights). Alternatively, the switch may include a single pole, single throw switch.

A housing may enclose the battery and the flasher, among other components of the apparatus. The housing may include a shelf that is mounted above the battery and the flasher. The indicator light(s) may be mounted in the shelf and exposed above the shelf. The switch may be mounted to a lower surface of the shelf. The positive and ground conductors are preferably disposed below the shelf. The shelf may have a slot formed therein and the harness means may extend through the slot. The harness means may include a conductor plug that is releasably engagable with the connector component of the trailer's light circuit. The housing may have a selectively openable and closable lid. Means may be mounted within the housing for selectively recharging the battery.

DETAILED DESCRIPTION OF PREFERRED EMBODIMENTS

Other objects, features and advantages will occur from the following description of preferred embodiments and the accompanying drawings, in which.

Figure 1:
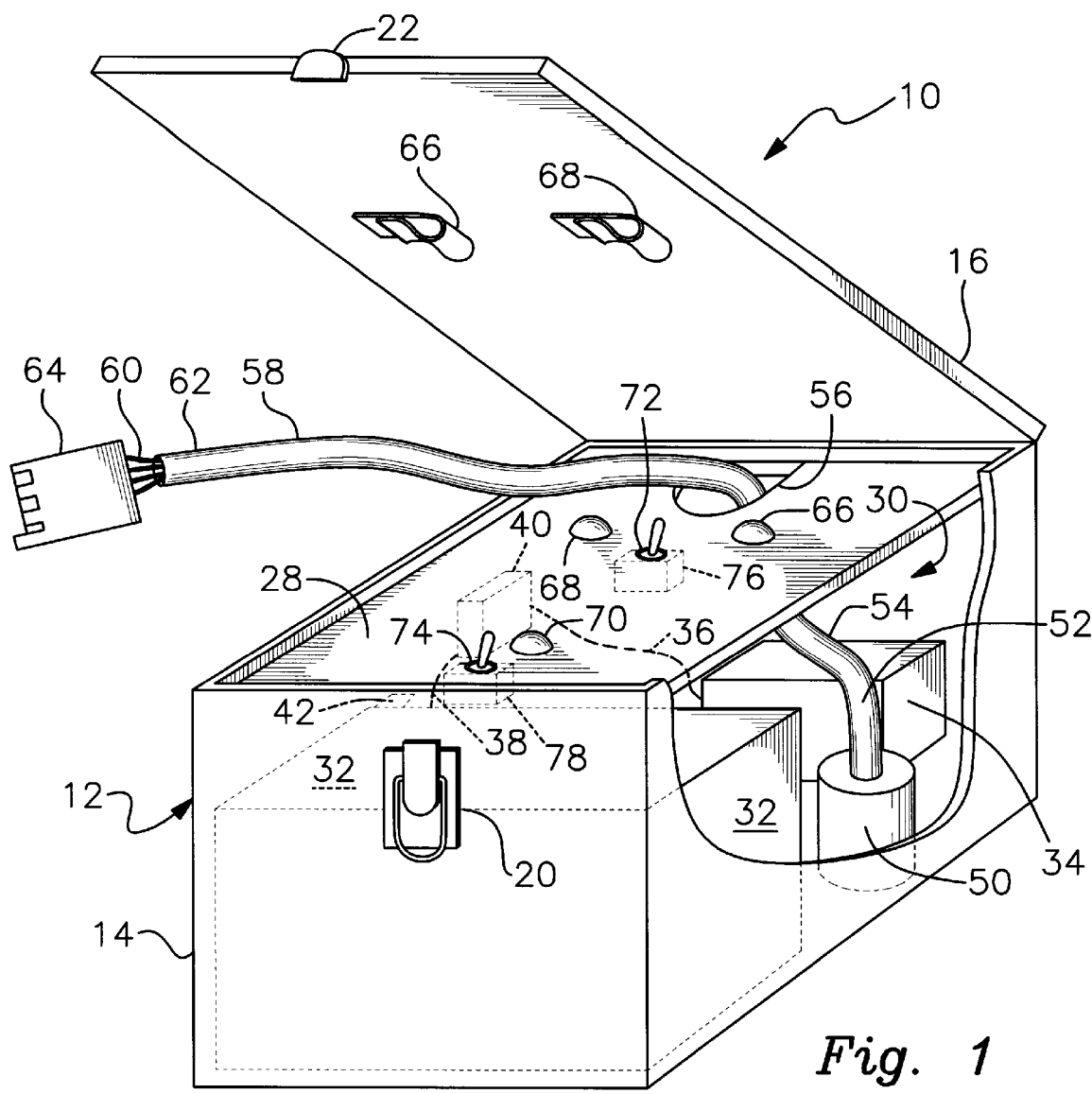
FIG. 1 is a perspective view of a preferred trailer light circuit test apparatus in accordance with this invention.
Figure 2:
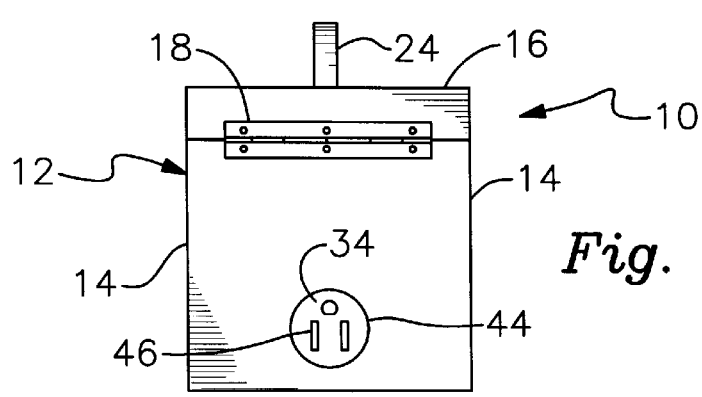
FIG. 2 is an elevational end view of the test apparatus with the housing closed and the AC recharger plug illustrated.

There is shown in FIGS. 1 and 2 a trailer light circuit test apparatus 10. The test apparatus includes a compact, box-like housing 12. The main body 14 of housing 12 features a generally rectilinear shape having four vertical sidewalls and a horizontal floor. A lid or closure 16 is hingedly attached to main body 14 by means such as a piano hinge 18. Various other types of hinges and pivots may be utilized to connect lid 16 to main body 14 such that the lid may be selectively opened and closed relative to the main body of the housing. As best shown in FIG. 1, standard latch components 20 and 22 are carried by main body 14 and lid 16, respectively. The latch components are operated in a conventional manner to secure the lid in a closed condition. This lid is typically closed when apparatus 10 is transported and stored. A handle 24, best shown in FIG. 2, is mounted in a standard, pivoting manner to the upper surface of lid 16. This handle is utilized to carry the test apparatus when the lid is in a closed and latched condition. Essentially, housing 12 resembles a shoebox, toolbox fishing tackle box or similar container. The operating components of tester 10 are mounted within housing 12 such that the entire apparatus is extremely convenient to transport, manipulate and use for testing various trailer light circuits.

The housing is preferably constructed of a molded plastic although various other materials, including metals and metal alloys, may be incorporated into the housing. The size of the housing and as a result the size of the entire test apparatus may be varied somewhat within the scope of this invention. However, the apparatus should be sufficiently compact so that it can be conveniently carried by a single person, preferably in one hand.

A shelf 28, FIG. 1, is mounted within housing 12 such that the upper surface of the shelf is disposed slightly below the open upper end of main body 14. Shelf 28 is secured in this position by any one of a variety of means. For example, the interior of the housing may include a lip or ledge or brackets on which the shelf sits. The shelf may be releasably attached to such support means by screws. Alternatively, shelf 28 may be carried by clips, notches or other types of releasable holders. Preferably, the shelf should be mounted so that is quickly and conveniently removed from the housing, as required, to access the various electrical components of apparatus 10.

When shelf 28 is mounted in the manner shown in FIG. 1, an interior chamber 30 is formed within the housing beneath the shelf. A number of the principal components of the tester are disposed within chamber 30. In particular, a DC battery 32 is mounted on the floor of housing 12. Battery 32 may preferably comprise a conventional rechargeable 12-volt alarm type battery. A rechargeable lead-acid battery of the type manufactured by Radio Shack® may be utilized. Typically, this battery is small and compact and lightweight enough to fit in the palm of a normal person's hand. Various alternative types of batteries may also be used, including AA, C and D cells. The precise construction of the battery will be well known to persons skilled in the art and does not constitute a feature of this invention.

Preferably, means are mounted within chamber 30 for recharging battery 32. In the version disclosed herein, such means include an alternating current adapter 34 that is rechargeably interconnected to battery 32 through a pair of conductors 36, 38 and float circuit 40 interconnected intermediately between wires 36 and 38. In particular, a float 40 provides the proper amperage to positive terminal 42 of battery 32. As best shown in FIG. 2, the main body 14 of housing 12 includes a circular opening 44 through which the prongs 46 of adapter 34 extend outwardly. Adapter 46 is interconnected (typically by an extension cord) to an AC outlet. As a result, power is delivered by the adapter through conductors 36, 38 and float 40 to recharge battery 32. The float ensures that the battery is maintained at its proper amperage.

Chamber 30 of main body 14 also accommodates a conventional 12-volt flasher 50. Input and output wires 52 and 54, respectively, are electrically interconnected to the flasher. These wires form a part of the tester circuit, which is described more fully below.

Shelf 28 has a substantially planer configuration. A notch 56 is formed in the shelf proximate the hinged end of housing 12. A wiring harness 58 extends through slot 56. Harness includes wiring 60 (comprising four wires), which is described more fully below. The wiring is largely covered by a split plastic tubing 62, which tubing serves to protect wiring 60 and facilitate manipulation and storage of the harness. A standard four-receptacle female plug 64 is connected electrically at the outer end of wiring 60. This plug is operably engaged, as described below, with the standard male connector plug used on most trailer light circuits. The inner end of harness 58 (not shown) is connected electrically to the various other components of the test apparatus. Such interconnection and the overall operation of the apparatus is, once again, described below. Preferably harness 58 comprises a standard four-wire colored coded harness having a length of approximately 18 inches. The harness may vary in length, as well as in the number of wires, type of wiring and type of connector that it employs. A pair of retaining clips 66 and 68 are carried by the inside surface of lid 16. The portion of harness 58 that extends outside of chamber 30 may be inserted into and held by clips 66 and 68 when apparatus 10 is not in use.

A plurality of switches and indicator lights are mounted to shelf 28. In particular, three pilot lights 66, 68 and 70 are mounted to the shelf such that the lights are exposed at the upper surface of the shelf. In the version disclosed herein, lights 66, 68 and 70 are green, red and blue respectively. As will be described more fully below in connection with FIG. 3, green light 66 is used for testing the right turn signal indicator; red light 68 is employed for testing the left turn signal indicator; and blue light 70 is utilized to test the running or driving lights of the trailer. It should be noted that, in most circumstances, the trailer's turn signal lights are also utilized as its brake lights; therefore, a separate indicator light for the brakes is not required, although it may optionally be used. Lights 66, 68 and 70 are integrated electrically into the test apparatus and operate in the manner hereinafter described. Many types of light elements (e.g. bulbs, lamps, LED's) and color combinations thereof may be employed. Preferably, the indicator light should have a long service life. The colors are completely arbitrary and may be selected to provide for quick and convenient readings.

A pair of toggle switches 72 and 74 are also mounted to shelf 28 such that the operating levers or toggles of those switches extend upperwardly from the shelf. Switch 72 is a single pole, double-throw switch and switch 74 is a single pole, single-throw switch. The switch casings 76 and 78 of switches 72 and 74 respectively, as well as their associated electrical interconnections, not shown, are suspended beneath shelf 28. Various brands of switches such as those manufactured Cole Hersee and other companies, may be employed. Assorted types of switch may be utilized within the scope of this invention. The switch should be accessible and convenient to manipulate. Once again, switches 72 and 74 are integrated electrically into the apparatus in a manner to be described below.

Figure 3:
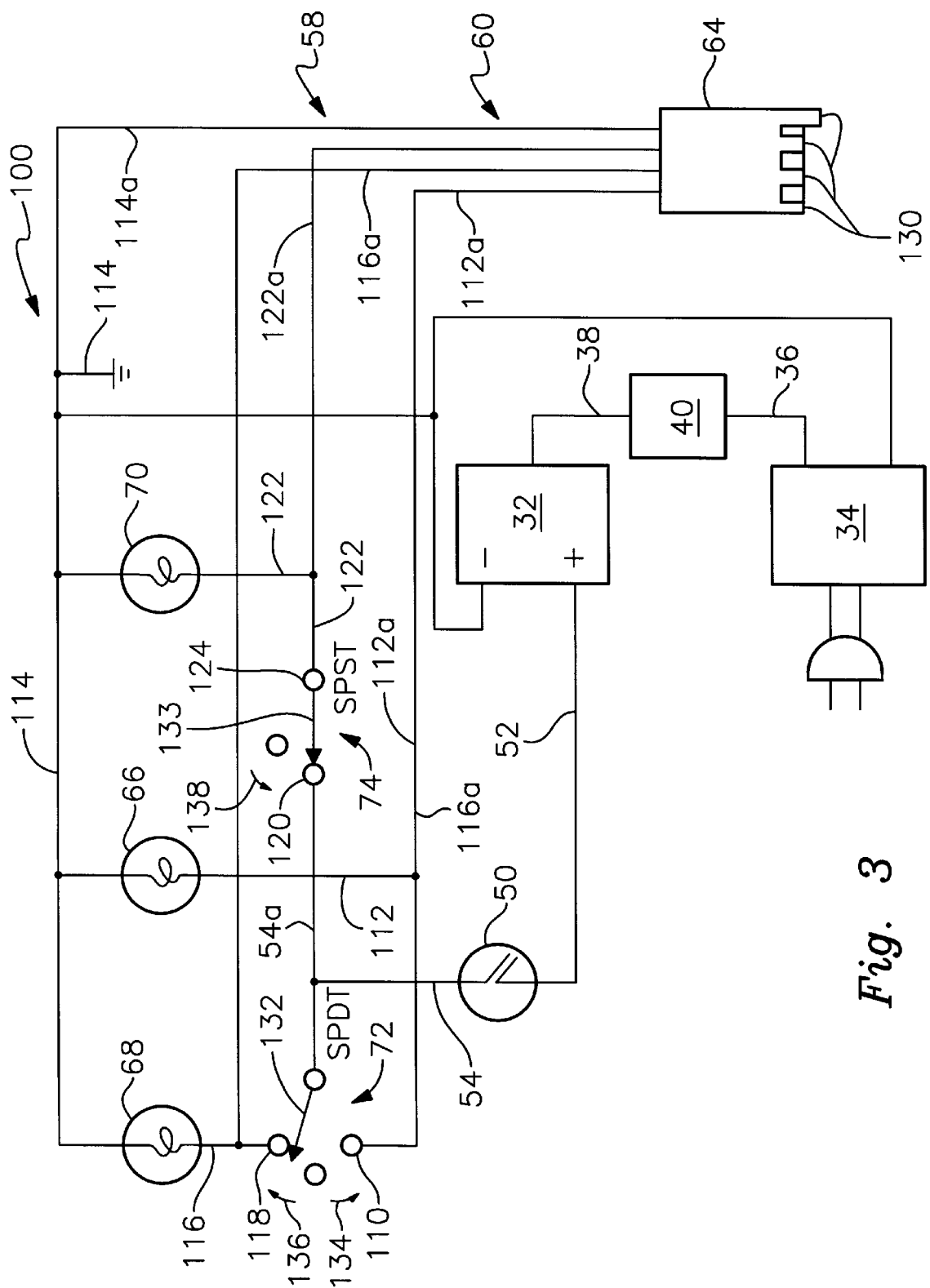
FIG. 3 is a schematic view of a preferred circuit used in the tester of this invention.

FIG. 3 illustrates a schematic diagram of a preferred electrical circuit 100 employed in test apparatus 10. Battery 32 includes standard positive and negative terminals. The positive terminal is connected through a conductor 52 to flasher 50. Conductor 54 electrically interconnects the flasher to a center "off" terminal CO of toggle switch 72. A positive conductor 112 interconnects a second terminal 110 of switch 72 and the input of green indicator light 66. A ground conductor 114 interconnects the output of light 66 and the negative terminal of battery 32.

A second positive conductor 116 interconnects third terminal 118 of switch 72 and the input of red indicator light 68. The output of light 68 is electrically interconnected to ground conductor 114 and thereby to battery 32.

Flasher 50 is electrically interconnected through conductor 54 and a branch conductor 54a to an input terminal 120 of switch 74. A third positive conductor 122 electrically interconnects output terminal 124 of switch 74 and an input of blue indicator light 70. The output of light 70 is, once again, connected to ground conductor 114.

The split tube covering is omitted from harness 58 in FIG. 3 so that the individual wires of the harness are depicted. In particular, harness 58 includes a first positive wire 112a that is connected to positive conductor 112 at switch terminal 110. The harness also includes a second positive wire 116a that is electrically interconnected to positive conductor 116 at switch terminal 118. A third positive wire 122a is joined electrically to third positive conductor 122. Finally, the harness includes a ground wire 114a that is grounded by interconnecting that wire electrically to the negative terminal of battery 32. In FIG. 3, ground wire 114a is shown as being connected directly to ground conductor 114. In alternative embodiments, the ground wire of the harness may be attached directly to the negative terminal of the battery. It should be understood that all of the electrical interconnections described herein are accomplished by suitable clips and other standard techniques that will be known to those skilled in the art.

The respective positive conductors and their associated positive wires are typically color coded to facilitate the wiring process. For example, conductor 112 and wire 112a may be green; conductor 116 and wire 116a may be yellow, conductor 122 and wire 122a may be brown; and the ground wiring 114 and 114a may be white. In alternative embodiments, various other color arrangements and color codings may be utilized.

The distal ends of harness wires 112a, 116a, 122a and 114a are joined to female connector plug 64 such that each wire is electrically engaged with a respective socket or receptacle 130 of plug 64. The precise means of interconnection between the wiring 60 and plug 64 is presently exhibited in standard wiring harnesses. Sockets 130 are configured such that they are electrically interengagable with corresponding prongs of the standard male connector plug found on most, if not virtually all known trailer light circuits.

While apparatus 10 is being stored or is otherwise not in use, battery 32 may be fully recharged by simply engaging adapter 34 with a standard AC outlet. As previously described, a charge is delivered via float 40 to the battery so that it better remains fully charged and available for testing a trailer's lights on short notice.

To perform testing, adapter 64 is disengaged from the AC outlet (if necessary) and apparatus 10 is carried to the trailer to be tested. Lid 16, FIG. 1, is opened and harness 58 is extended from the tester. Female connector plug 64, FIGS. 1 and 3, is connected with the standard male plug of the trailer's light circuit (not shown). The wiring circuit shown in FIG. 3 is configured such that green indicator light 66 and wires 112 and 112a are interconnected to the wiring associated with the trailer's right turn signal light; indicator light 68 and wires 116 and 116a are interconnected to the wiring associated with the trailer's left turn light; and indicator 70 and wires 122 and 122a are interconnected to the wiring associated with the trailer's running lights. Likewise, when the male and female connector plugs are joined, the ground wires 114 an d 114a are connected to the ground wire of the trailer's lighting circuit. The apparatus is now ready to be used to test the light circuit of the trailer.

Initially, switches 72 and 74 are o pen and the respective toggles 132 and 133 of those switches extend generally vertically. As a result, positive conductors 112, 116 and 122 are all electrically disconnected from battery 32 and de-energized. The respective indicator lights remain "off". To check the condition of the trailer's right turn signal, toggle 132 of switch 72 is switched into the closed state, as indicated by arrow 134. This causes electrical power to be delivered fro m the battery through flasher 50 and switch 72 to positive conductor 112. If the right turn signal light and associated wiring of the trailer are operative, a circuit is completed through positive wire 112a and the electrically interconnected circuit of the trailer. As a result, the signal from flasher 50 causes green indicator light 66 to flash intermittently. This indicates that the right turn signal light and associated wiring of the trailer are operating properly. If, however, the right turn signal light of the trailer is defective or there is a problem with its associated wiring, a circuit is not completed through 112a and the interconnected wiring of the trailer. As a result, the flasher does not cause light 66 to flash. Instead, the indicator light glows continuously or steadily while switch 72 remains in the closed state represented by arrow 134. This indicates immediately that there is a problem with the right turn signal or its wiring. That problem may be further investigated and rectified.

The left turn signal light of the trailer and its wiring are tested in a similar manner. Toggle 132 of double-throw switch 72 is closed in the direction of arrow 136. As a result, the switch completes a connection between the flasher and positive conductor 116. This causes the positive conductor and its associated red indicator light 68 to be energized by the battery. If the trailer's left turn signal light and its associated positive and ground wires are in good working condition, the positive wire 112a of harness 58 is energized and a circuit through the harness and the right turn wiring of the trailer is completed. This causes light 68 to flash intermittently in response to the signal from flasher 50. Conversely, if there is a break in the wiring of the trailer's right turn signal or if the right turn bulb is defective, a circuit is not completed through positive wiring 112a and the attached trailer wiring. As a result, red indicator light 68 does not flash and, instead, glows red continuously while the toggle 132 remains closed in the direction of arrow 136. This promptly indicates that there is a defect or problem in the left turn signal light or its associated wiring. Corrective action can then be taken.

The running or driving lights of the trailer are similarly tested using switch 74. Toggle 133 is closed in the direction of 138. As a result, positive conductor 122 is energized. In the absence of a problem with either the trailer's running lights or their associated circuitry, an energized electrical circuit is completed through wire 122a of harness 58 and the interconnected wiring of the trailer's driving lights. Completion of this circuit causes blue indicator light 70 to flash intermittently in response to the signal it receives from flasher 50. Once again, however, if there is a problem with the running lights or their circuitry, an energized electrical circuit is not completed through wire 112a and the trailer wiring attached thereto. Light 70 then glows continuously or solidly while switch 74 remains closed. In situations where only one of the normally two running lights is inoperative, the flasher 50 will direct indicator 70 to flash intermittently at a frequency that is half its normal frequency. In either case, the source of the lighting problem is narrowed almost immediately.

Circuit 100 enables specific lighting and wiring problems to be isolated and identified relatively quickly and conveniently. If only one of the indicator lights 66, 68 and 70 glows solidly when its associated switch closes, this indicates that there is a problem with either the associated trailer light component (i.e. the bulb) or the positive lead attached to that component. This can also mean that the connector plug 64 is not operably engaged with the trailer's connector plug. Alternatively, if all of the indicator lights glow continuously or solidly when any one switch is closed, this typically means that there is a faulty ground wire in the trailer or a loose ground connection at the tongue of the trailer. In any event, after the source of the problem is narrowed, the investigator can take prompt steps to resolve the problem by either replacing an inoperative bulb or repairing defective wiring.

The previously described testing is performed quickly and conveniently at a single location. The person conducting the test does not have to walk back and forth between a battery at the front of the trailer and the lights at the rear of the trailer. Moreover, an assistant is not required and an automobile does not have to be connected to the trailer. Lugging a cumbersome automobile battery to the trailer is also eliminated. The time required for testing the trailer's lights and its associated circuit is reduced from over 30 minutes, as is commonly required, to approximately 30 seconds. Moreover, tests using apparatus 10 can be performed quickly, conveniently and accurately in a storage lot that is crowded with trailers and wherein space is quite limited. The invention may be used with virtually all types of trailer lighting circuits and all types of standard connectors.

Although specific features of the invention are shown in some drawings and not others, this is for convenience only, as each feature may be combined with any or all of the other features in accordance with the invention. Other embodiments will occur to those skilled in the art and are within the following claims.

What is claimed is:

1. An apparatus for electrically testing the standard light circuit of a trailer independently of a vehicle that tows the trailer, which light circuit includes a plurality of trailer lights, a like plurality of respective positive wires, at least one ground wire electrically connected to the trailer lights, and a standard connector component interconnected to the trailer lights by the positive and ground wires and selectively engaged with a source of electric power to energize the light circuit, said apparatus comprising:

a battery;

a plurality of indicator lights, each being associated with a respective trailer light;

a ground conductor interconnected between a negative terminal of said battery and each said indicator light;

harness means releasably attached to the connector component of the trailer light circuit for electrically connecting each said indicator light to a corresponding positive wire of the light circuit and electrically connecting said negative terminal of said battery to the ground wire of the light circuit; and means for electrically interconnecting a positive terminal of said battery to a selected one of said indicator lights such that said indicator light flashes intermittently when the associated trailer light, respective positive wire and ground wire of the trailer light circuit are operative and glows continuously when one or more of the associated trailer light, respective positive wire and ground wire of the light circuit are inoperative, said means for electrically interconnecting including a flasher component electrically connected to said positive terminal of said battery, and switch means interconnected between said flasher component and each said indicator light for selectively establishing and breaking electrical connection between said battery and said indicator light.

2. The apparatus of claim 1 in which at least one said switch means includes a toggle switch.

3. The apparatus of claim 2 in which a pair of said switch means comprise a single pole, double throw switch.

4. The apparatus of claim 2 in which at least one said includes a single pole, single throw switch.

5. The apparatus of claim 1 further including a housing that encloses said battery and said flasher.

6. The apparatus of claim 5 in which said housing includes a shelf mounted above said battery and said flasher.

7. The apparatus of claim 6 in which each said indicator light is mounted in said shelf and exposed above said shelf.

8. The apparatus of claim 6 in which each said switch means is mounted to a lower surface of said shelf.

9. The apparatus of claim 6 in which each said positive conductor and said ground conductor are disposed below the shelf.

10. The apparatus of claim 6 in which said shelf has a slot therein and said harness means extends through said slot.

11. The apparatus of claim 1 in which said harness means include a connector plug that is releasably engagable with the connector component of the lighting circuit.

12. The apparatus of claim 5 in which said housing includes a selectively openable and closable lid.

13. The apparatus of claim 5 fully including means mounted in said housing for selectively recharging said battery.

14. The apparatus of claim 1 in which said means for electrically interconnecting further include a plurality of separate and distinct positive conductors, each positive conductor being interconnected between said switch means and a respective said indicator light.

15. A combined trailer light circuit and apparatus for electrically testing the circuit comprising:

a trailer light;

an electrical connector component;

positive and ground wires electrically interconnecting said trailer light and said connector component;

a portable housing;

a battery that is disposed within said housing;

an indicator light associated with the trailer light;

a ground conductor interconnected between a negative terminal of said battery and said indicator light;

harness means releasably attached to the connector component of the light circuit for electrically connecting said positive conductor to said positive wire and electrically connecting said negative terminal of said battery to said ground wire; and means for electrically interconnecting a positive terminal of said battery to said indicator light such that said indicator light flashes intermittently when said trailer light, said positive wire and said ground wire are operative and glows continuously when one or more of said trailer light, said positive wire and said ground wire are inoperative, said means for electrically interconnecting including a flasher component electrically connected to said positive terminal of said battery, and switch means interconnected between said flasher component and said indicator light for selectively establishing and breaking electrical connection between said battery and said indicator light.

16. A combined trailer light circuit and apparatus for electrically testing the circuit comprising:

a plurality of trailer lights, each performing a respective lighting function;

a plurality of corresponding positive wires, each electrically connected to a respective one of said trailer lights;

a ground wire electrically connected to each of said trailer lights;

a trailer light connector component electrically connected to and carried by said positive and ground wires;

a portable housing;

a battery disposed within said housing;

a plurality of indicator lights, each being associated with a respective trailer light;

a ground conductor interconnected between a negative terminal of said battery and each said indicator light;

harness means releasably attached to said connector component for electrically connecting each said indicator light to a corresponding positive wire and electrically connecting said negative terminal of said battery to said ground wire; and means for electrically interconnecting a positive terminal of said battery to a selected one of said indicator lights such that said indicator light flashes intermittently when said associated trailer light, respective positive wire and ground wire are operative and glows continuously when one or more of said associated trailer light, respective positive wire and ground wire are inoperative, said means for electrically interconnecting including a plurality of separate and distinct positive conductors, each connected to a respective one of said indicator lights, a flasher component electrically connected to said positive terminal of said battery, and switch means interconnected between said flasher component and each said positive conductor for selectively establishing and breaking electrical connection between said battery and said indicator light.

* * * * *